United States Patent [19]
Carpentier

[11] 4,308,894
[45] Jan. 5, 1982

[54] DUST TRAP AND VALVE WITH AUXILIARY PRESSURE EQUALIZING VALVE

[76] Inventor: Urgel R. Carpentier, 3 Bailey Ave., Plattsburgh, N.Y. 12901

[21] Appl. No.: 112,332

[22] Filed: Jan. 15, 1980

[51] Int. Cl.³ .................... G01F 11/26; F16K 1/20
[52] U.S. Cl. ........................... 137/630.15; 222/450
[58] Field of Search ............... 137/630.14, 630.15; 222/445, 450

[56] References Cited

U.S. PATENT DOCUMENTS

| | | | |
|---|---|---|---|
| 760,449 | 5/1904 | Guy | 137/630.14 |
| 791,339 | 5/1905 | Gold | 137/630.15 |
| 1,618,756 | 2/1927 | Gold | 137/630.15 |
| 1,656,393 | 1/1928 | Russell | 137/630.15 |
| 1,850,094 | 3/1932 | Dean | 137/630.14 X |
| 2,665,714 | 1/1954 | Greenwood | 137/630.14 X |
| 2,839,082 | 6/1958 | Moore | 137/630.15 |
| 3,257,045 | 6/1966 | Carpentier | 222/450 |
| 3,542,255 | 11/1970 | Oetiker | 137/630.14 X |
| 3,804,124 | 4/1974 | Finke | 137/630.14 |
| 4,067,359 | 1/1978 | Kwast | 137/630.15 |

FOREIGN PATENT DOCUMENTS 2015065 10/1970 Fed. Rep. of Germany ........ 137/630.15

*Primary Examiner*—Robert G. Nilson
*Attorney, Agent, or Firm*—James W. Fitzsimmons; Warren N. Low

[57] ABSTRACT

A dust trap and valve for bag houses and the like wherein the dust trap valve flap is provided with an auxiliary valve to equalize pressure for easier valve operation while the system is vacuumized. A lost motion drive train permits opening of the auxiliary valve before the flap valve and closing thereof before the flap valve.

4 Claims, 4 Drawing Figures

DUST TRAP AND VALVE WITH AUXILIARY PRESSURE EQUALIZING VALVE

BACKGROUND OF THE INVENTION

The present invention relates to a dust trap and valve for controlling a flow through the dust trap, and more particularly, to an improved pressure balancing auxiliary valve located in the dust trap valve, which functions to reduce the force required to open the dust trap valve.

Dust traps of the type herein referred to have been used for years in collection systems such as bag houses—which in a typical installation comprise hundreds of vacuum cleaner type bags positioned in the flow of the output of a chimney or other flue device. The vacuum cleaner bags act to collect any impurities in the flow to provide clean air to this ecologically-minded world.

In a typical installation, the vacuum cleaner bags are arranged vertically in the flow path and then they are shaken (usually in a predetermined cycle) to permit the collected dust and other particles to drop to the bottom where they are collected in a dust trap.

The problem is to open the dust trap and remove the collected debris while the vacuum mechanism of the entire system is still in operation. This invention is directed toward that purpose.

In my previously issued U.S. Pat. No. 3,257,045 and entitled DUST TRAP AND VALVE THEREFOR, patented JUNE 21, 1966, a complete description of the operation of dust traps and valves is given, but basically, a valve body is mounted in the dust trap of an enclosed system in such a manner that it defines a valve seat and matching valve flap which closes the valve. In the cyclic cleaning of the system, the valve flap is opened to dump the contents collected in the valve, and then the valve flap is closed again.

It must be recognized that the valve seat and valve flap combination might close a flow path having an area of 200 square inches. Accordingly, the differential pressure across the valve flap, when the bag house is in operation, can require the application or use of a tremendous force to break the vacuum and pull the valve flap away from the valve seat to dump the contents.

It is the purpose of this invention to position an auxiliary valve in the valve flap to permit an initial balancing of pressure across the valve flap before it is opened thereby greatly reducing the force required to open the valve.

Therefore, it is the first object of this invention to provide an improved dust trap valve.

It is an additional object of this invention to provide a pressure release system for a dust trap valve, and, It is still an additional object of this invention to provide an auxiliary release valve for a dust trap in which the pressure across the flap is balanced before the valve flap is moved from its closed position.

DESCRIPTION OF THE DRAWINGS

These and other objects and advantages of this invention will become apparent upon reference to the following specification and drawings, wherein.

DETAILED DESCRIPTION OF THE INVENTION

Figure 1:
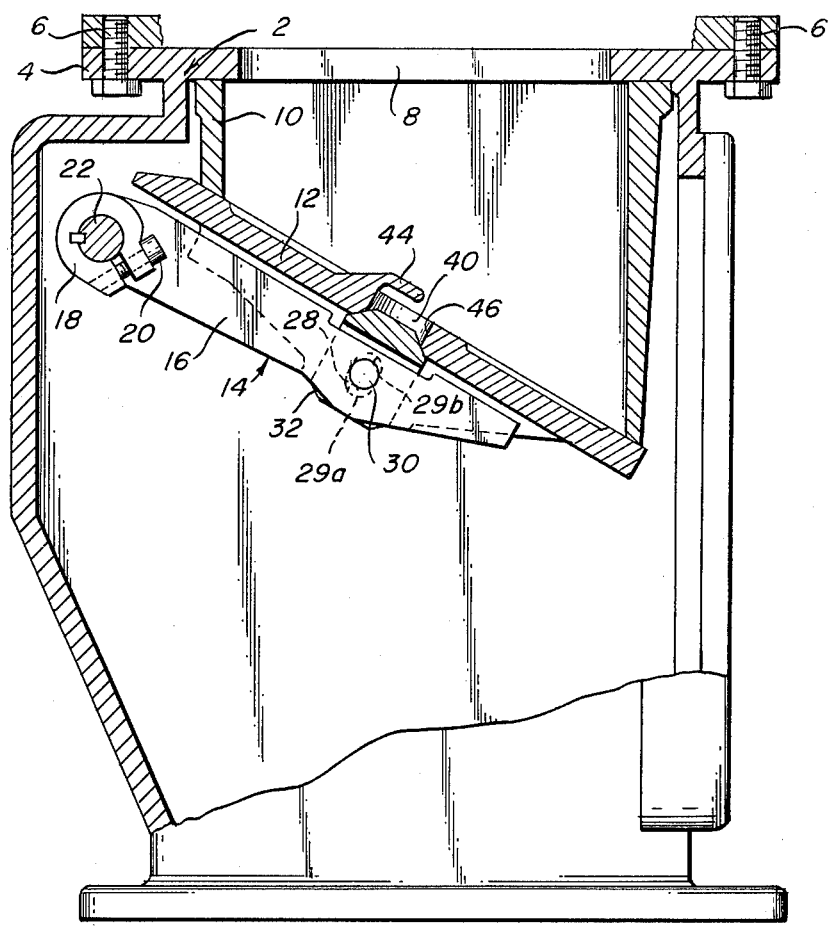
FIG. 1 is a side elevation in section, showing a valve body including a valve seat and a matching flap, having an auxiliary valve, both in the closed position.

Referring now to FIG. 1, a valve body 2 is shown having a flange 4, which is mounted by bolts 6 into a vacuum system, not shown.

The valve body 2 defines a central flow path therethrough, which is indicated by the passageway 8. A rectangular, hollow valve seat 10 is shown mounted in valve body 2 to control the flow path through the passageway 8. The valve seat 10, in turn, is closed by a valve flap 12 which is supported for movement into and out of engagement with the valve seat.

The valve flap is supported by and is moved by an articulated drive train shown generally at 14. Specifically, an arm 16 has an integral collar 18 which is positively connected by bolt 20 to a shaft 22. Actuating means for the shaft 22 is not shown, but is it supported for rotational movement by an applied hydraulic or mechanical force as seen, for example, in my earlier patent. Upon rotation of the shaft 22 arm 16 will pivot with the shaft.

The opposite end of arm 16 is connected to the flap 12 to move the same into or out of engagement with the valve seat 10 in response to the pivoting of the arm 16.

My invention is directed to the interconnection of the arm 16, and the flap 12, to provide for the balancing of the pressure on either side of the flap 12 before the flap is pulled away from the valve seat 10.

It must be understood that, when closed, the valve flap, 12, seals the flow path through the annular valve seat 10. Actually, the matching surfaces are ground and polished to provide a substantially vacuum-tight interconnection between the flap 12 and the seat 10. The flap is supported for movement into an out of sealing engagement with the valve seat through its connection with the articulated drive chain 14. Specifically, the valve flap has as an integral part thereof, a pair of ribs 24 and 26, which strengthen the flap and provides for its interconnection to the drive train.

Figure 3:
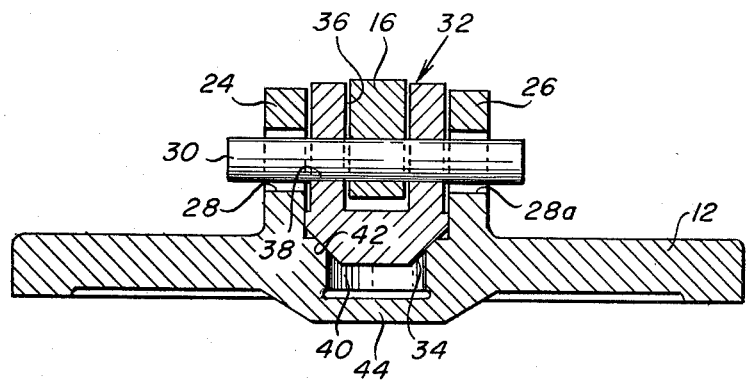
FIG. 3 is a top elevation partly in section, showing the common connection between the drive train and both the auxiliary valve and the flap, to provide for positive movement of the plunger of the auxiliary valve before the flap is moved.

The ribs 24, 26, each define its own elliptical bore, 28 and 28A, respectively, shown both in FIGS. 1 and FIG. 3. The elliptical bore has a dimension in one axis to substantially match the diameter of a wrist pin 30, while at 90° to that axis the bore is elongated to permit controlled incremental movement of the wrist pin 30 relative to the ribs 24, 26. Wrist pin 30 is positively connected to the arm 16 which lies midway between the spaced ribs 24, 26.

This structural interconnection permits the wrist pin 30 to force the flap 12 into and out of engagement with the valve seat 10 in response to pivotal movement of arm 16.

Figure 4:
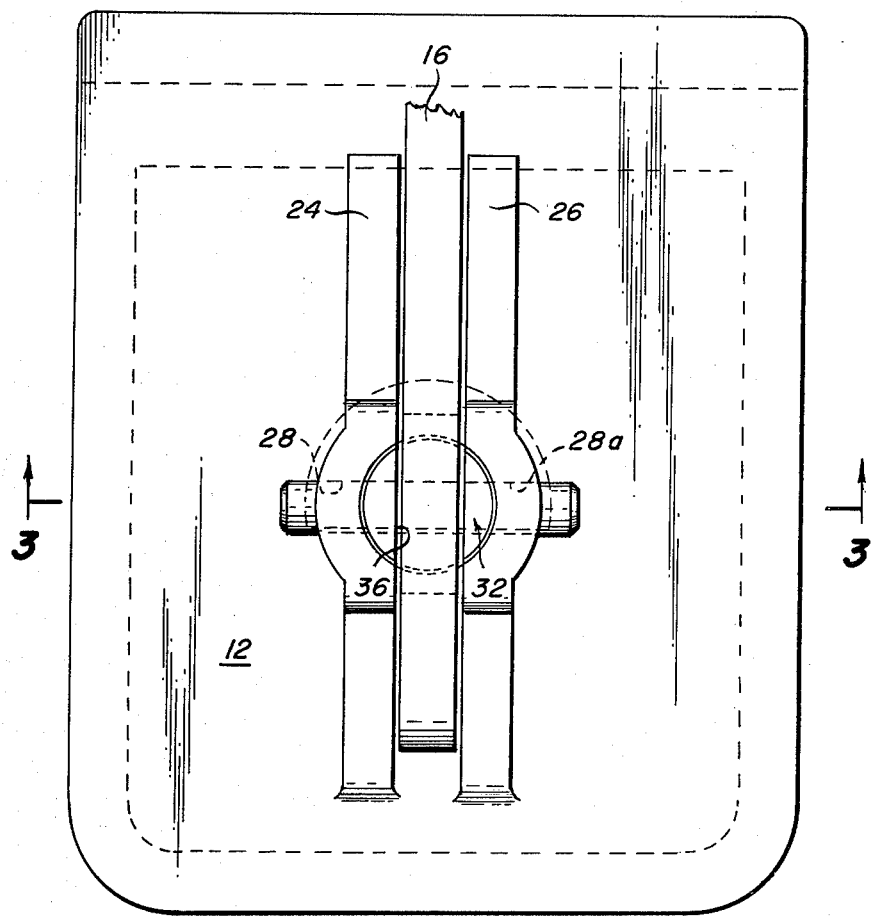
FIG. 4 is a front elevation showing an arm in the drive train connected through a common pin to both the valve flap and plunger of the auxiliary valve.

In FIGS. 3 and 4, an auxiliary valve plunger, 32, is shown as a truncated cylinder having a valve surface 34, a central slot 36, and a wrist pin receiving bore 38, which is dimensioned to match the diameter of and to receive the wrist pin 30, in a bearing-like arrangement to provide positive transaxial movement of the wrist pin and axial movement of the plunger 32 in response to pivotal movement of arm 16.

It will be noted in FIG. 4 that the arms 24, 26 define a central cylinder-like guide for the plunger 32, to permit confined axial movement of the plunger relative to the arms.

Figure 2:
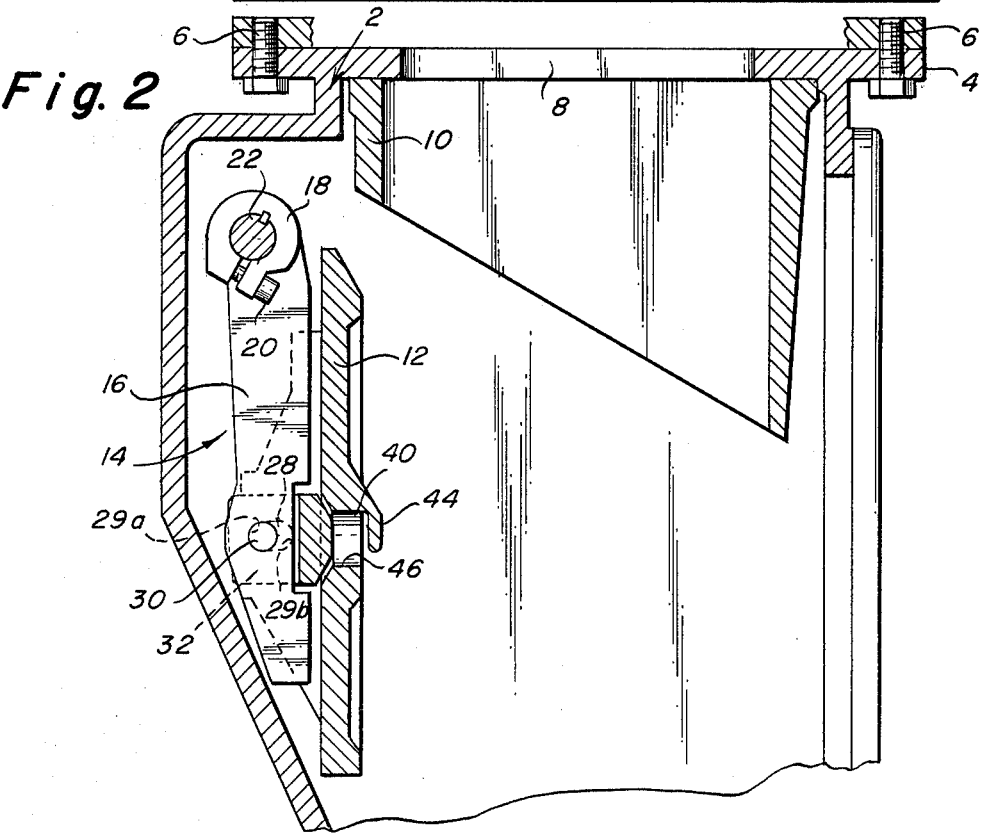
FIG. 2 is a side elevation partly in section, showing the auxiliary valve in its open position.

As shown in FIGS. 1, 2 and 3, the valve flap 12 defines a central port 40 which includes a valve seat 42 which in turn matches the valve surface 34 of the plunger 32. Obviously, the matching surfaces 34, 42, are ground to provide a vacuum-tight seal when the plunger 32 is pressed against the flap, 12.

A generally L-shaped bracket 44 prevents the clogging of the port 40, by dust gravitating onto the inclined valve flap 12.

The arm 16, the plunger 32, and the ribs 24, 26, are all interconnected by the wrist pin 30. The wrist pin 30 provides a common connection between arm 16, and both plunger 32, and flap 12. Specifically, the wrist pin has a positive connection with the arm 16 and with the plunger 32, but in view of the elliptical shape of the bore 28, 28a, in ribs 24, 26, it is obvious that the wrist pin can move relative to the ribs 24, 26 through a predetermined incremental distance before engaging the valve-open end 29a, or the valve-closed end 29b, or bores 28, 28a.

OPERATION

In operation, then, and assuming a pressure differential across the flap 12, when the shaft 22 is rotated in a clockwise direction, as viewed in FIG. 1, the arm 16 follows and actuates the wrist pin 30 to first pull the plunger 32 away from the flap 12 to permit a flow through the bore 40 and around the plunger valve surface 34 to aid in balancing the pressure on either side of the valve flap 12 before the arm 16 acts to pull the larger flap 12 away from the valve seat 10, thereby reducing the force required to pull the flap 12 away from the valve seat 10.

More specifically, the area of the valve surface 34 and matching the valve seat 42 closing port 40 is very small relative to the total area of the flap 12 and matching valve seat, 10. It follows that the force required to pull the valve plunger 32 away from the flap 12 is very small indeed, relative to the force that would be required to pull the entire flap away from the valve seat 10.

Once the valve flap is opened, the valve is dumped, then the flap 12 is to be closed against the valve seat 10 ggain. To accomplish this, the shaft 22 is rotated in a counter-clockwise direction pivoting arm 16 in a counter-clockwise direction, shifting the wrist pin 30 to move the plunger 32 into engagement with the valve surface 34 before the pin acts on the ribs, 24, 26 of the flap 12. The flap 12 with its bore 40 now closed by the plunger 32, then moves into engagement with the valve seat 10.

It is obvious that the present embodiment of the invention is to be considered as illustrative and not restricted since the invention may be embodied in other specific forms without departing from the spirit or essential characteristics of it.

Accordingly, what is claimed and desired to be secured by United States Letters Patent, is:

1. In a dust trap which defines a flow path axially therethrough, a device positioned within said dust trap and in said flow path for controlling the flow therethrough, comprising:
   (a) a valve seat defining an opening, a matching valve flap, and an articulated single arm drive train having flap connecting means for supporting said flap to move the same in response to movement of said drive train into and out of closing engagement with said valve seat;
   (b) said flap connecting means including as an integral part thereof, a two-piece pressure regulating valve comprising a port and a matching plunger, with the port being defined by said flap to provide for a flow therethrough when said plunger is displaced from said port, said flap having a shield on the side opposite said plunger and substantially covering said port to prevent clogging of said pressure regulating valve;
   (c) said plunger and said flap each having a common connection to said articulated drive train in a manner to provide for a predetermined incremental movement of said plunger in either direction before said flap responds to the movement of said train, whereby when said drive train is actuated to move said flap towards its open position, said plunger is withdrawn from said port to first release and balance the pressure across said flap before said flap is removed from its valve seat and whereby said plunger positively closes said port before the flap is moved toward its closed position.

2. The invention of claim 1 wherein said pivotal arm, said plunger and said flap each define a bore transverse to their prescribed movement with said arm and said plunger having a positive connection with said pin to provide for a positive incremental axial displacement of said pivotal arm and said plunger relative to said flap before said flap is moved in either direction, thereby providing for the positive closure of said pressure regulating valve before said flap is moved into closing engagement with said valve seat.

3. In a dust trap which defines a flow path axially therethrough, a device positioned within said dust trap and in said flow path for controlling the flow therethrough, comprising:
   (a) a valve seat defining an opening, a matching valve flap, and means including a single actuating arm supporting said flap for pivotal movement into and out of engagement with said valve seat;
   (b) said pivotal flap supporting means including as an integral part thereof, a two-piece pressure regulating valve comprising a port and a matching plunger with the port being defined by said flap to provide for a flow therethrough when said plunger is displaced from said port, said flap having a shield on the side opposite said plunger substantially covering said port to prevent clogging of said pressure regulating valve;
   (c) said plunger and said flap each having a common connection to said valve supporting means to provide for a predetermined positive incremental movement of said plunger relative to said flap in either direction in response to the pivotal movement of said supporting means whereby when said pivotal supporting means is actuated to move said flap towards its open position, said plunger is withdrawn from said port to first release and balance the pressure across said flap before said flap is removed from its valve seat and providing for the positive closure of said pressure relief valve before said flap closes in said valve seat.

4. The invention of claim 3 wherein said pivotal supporting means comprises an articulated drive train including a single pivotal arm and said common connecting means is a wrist pin in tight fit with said arm and plunger and in elliptical fit with said flap.

* * * * *